US012643766B2

(12) United States Patent
Schmidt et al.

(10) Patent No.: US 12,643,766 B2
(45) Date of Patent: Jun. 2, 2026

(54) ELEVATOR SYSTEM OPERATION ADJUSTMENT BASED ON COMPONENT MONITORING

(71) Applicant: OTIS ELEVATOR COMPANY, Farmington, CT (US)

(72) Inventors: Walter Thomas Schmidt, Marlborough, CT (US); Soumalya Sarkar, Manchester, CT (US); Paul R. Braunwart, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 684 days.

(21) Appl. No.: 18/178,843

(22) Filed: Mar. 6, 2023

(65) Prior Publication Data

US 2023/0202797 A1 Jun. 29, 2023

Related U.S. Application Data

(63) Continuation of application No. 16/233,713, filed on Dec. 27, 2018, now Pat. No. 11,597,629.

(51) Int. Cl.
*B66B 1/28* (2006.01)
*B66B 1/34* (2006.01)
(Continued)

(52) U.S. Cl.
CPC .............. *B66B 1/28* (2013.01); *B66B 1/3407* (2013.01); *B66B 1/3446* (2013.01);
(Continued)

(58) Field of Classification Search
CPC ....... B66B 1/28; B66B 1/3407; B66B 1/3446; B66B 1/3492; B66B 5/02; B66B 13/143;
(Continued)

(56) References Cited

U.S. PATENT DOCUMENTS

| | | | |
|---|---|---|---|
| 5,027,299 A | 6/1991 | Jetani | |
| 5,042,621 A | 8/1991 | Ovaska et al. | |

(Continued)

FOREIGN PATENT DOCUMENTS

| | | |
|---|---|---|
| CN | 101955100 A | 1/2011 |
| CN | 104310135 A | 1/2015 |

(Continued)

OTHER PUBLICATIONS

Extended European Search Report for Application No. EP 19 21 7230 dated Jun. 10, 2020.

*Primary Examiner* — Jeffrey Donels
(74) *Attorney, Agent, or Firm* — Carlson, Gaskey & Olds, P.C.

(57) ABSTRACT

An illustrative example embodiment of an elevator system includes a plurality of components respectively configured for at least one function during operation of the elevator system. A plurality of sensors are each associated with at least one of the components. Each sensor senses at least one characteristic of an actual performance of an associated one of the components. A processor is configured to receive respective indications from the sensors regarding the actual performance of the associated components, determine a difference between the actual performance and a desired performance of any of the components based on the respective indications, and determine an adjustment to the operation of the elevator system based upon the determined difference.

18 Claims, 4 Drawing Sheets

(51) Int. Cl.
*B66B 5/02* (2006.01)
*B66B 13/14* (2006.01)

(52) U.S. Cl.
CPC .............. *B66B 1/3492* (2013.01); *B66B 5/02* (2013.01); *B66B 13/143* (2013.01)

(58) Field of Classification Search
CPC ... B66B 5/0025; B66B 5/0018; B66B 5/0031; B66B 5/0037
See application file for complete search history.

(56) References Cited

U.S. PATENT DOCUMENTS

| | | | |
|---|---|---|---|
| 5,329,077 | A | 7/1994 | Skalski et al. |
| 5,616,894 | A | 4/1997 | Nieminen et al. |
| 6,516,923 | B2 | 2/2003 | Lence Barreiro et al. |
| 6,604,611 | B2 | 8/2003 | Liu et al. |
| 6,863,161 | B2 | 3/2005 | Mearns et al. |
| 7,172,055 | B2 | 2/2007 | Engel et al. |
| 8,464,841 | B2 | 6/2013 | Birrer et al. |
| 9,604,818 | B2 | 3/2017 | Kallioniemi et al. |
| 9,747,585 | B2 | 8/2017 | Eleid et al. |
| 9,988,239 | B2 | 6/2018 | Toutaoui |
| 2014/0027209 | A1 | 1/2014 | Kallioniemi et al. |
| 2020/0207573 | A1 | 7/2020 | Schmidt et al. |

FOREIGN PATENT DOCUMENTS

| | | | | | |
|---|---|---|---|---|---|
| CN | 104944237 | A | | 9/2015 | |
| CN | 105035928 | A | | 11/2015 | |
| CN | 106044523 | A | | 10/2016 | |
| CN | 106586753 | A | | 4/2017 | |
| CN | 106698135 | A | | 5/2017 | |
| CN | 107021405 | A | | 8/2017 | |
| CN | 107117510 | A | | 9/2017 | |
| CN | 110654948 | A | * | 1/2020 | ........... B66B 5/0037 |
| CN | 110654949 | A | * | 1/2020 | ........... B66B 5/0037 |
| EP | 0615945 | | | 9/1994 | |
| EP | 3293137 | A1 | | 3/2018 | |
| JP | H07235994 | A | | 9/1995 | |
| JP | 09237103 | A | | 9/1997 | |
| JP | 2001084021 | A | | 3/2001 | |
| JP | 2008168976 | A | | 7/2008 | |
| JP | 2009155043 | A | | 7/2009 | |
| JP | 2011020758 | A | | 2/2011 | |
| JP | 2014164322 | A | | 9/2014 | |
| KR | 20130009308 | A | | 1/2013 | |
| KR | 20170075267 | A | | 7/2017 | |
| KR | 101845970 | B1 | | 4/2018 | |
| KR | 101867605 | B1 | | 7/2018 | |
| WO | 2005115902 | A1 | | 8/2005 | |
| WO | 2017115100 | A1 | | 7/2017 | |
| WO | 2018177829 | A1 | | 10/2018 | |
| WO | 2018211165 | A1 | | 11/2018 | |

* cited by examiner

ELEVATOR SYSTEM OPERATION ADJUSTMENT BASED ON COMPONENT MONITORING

CROSS-REFERENCE TO RELATED APPLICATIONS

This application is a continuation of U.S. patent application Ser. No. 16/233,713, filed on Dec. 27, 2018, issued as U.S. Pat. No. 11,597,629 on Mar. 7, 2023.

BACKGROUND

Elevator systems are useful for carrying passengers between different levels in a building. There are a variety of components involved in elevator system operation to ensure proper system operation and passenger comfort. Good ride quality depends on many of the components being in good operating condition. Over time some components may wear or become damaged, which may introduce noise or vibration and reduce ride quality for passengers or eventually interfere with continued operation of the elevator system.

Elevator systems are typically designed to operate at contract speeds using preset motion profiles. When a problem occurs that interferes with proper system operation, the elevator is typically taken out of service until maintenance personnel are able to address the situation. One drawback of this approach is that when the elevator is taken out of service, it is not available to provide service to potential passengers.

SUMMARY

An illustrative example embodiment of an elevator system includes a plurality of components respectively configured for at least one function during operation of the elevator system. A plurality of sensors are each associated with at least one of the components. Each sensor senses at least one characteristic of an actual performance of an associated one of the components. A processor is configured to receive respective indications from the sensors regarding the actual performance of the associated components, determine a difference between the actual performance and a desired performance of any of the components based on the respective indications, and determine an adjustment to the operation of the elevator system based upon the determined difference.

In an example embodiment having one or more features of the elevator system of the previous paragraph, the processor is configured to determine an expected remaining service life of at least one of the components based on the respective indication from the sensor associated with the at least one of the components.

In an example embodiment having one or more features of the elevator system of any of the previous paragraphs, the processor is configured to determine whether service is required for the at least one of the components having the determined expected remaining service life.

In an example embodiment having one or more features of the elevator system of any of the previous paragraphs, the processor is configured to determine a time when the service is required and to issue a request for service according to the determined time.

In an example embodiment having one or more features of the elevator system of any of the previous paragraphs, the processor is configured to determine a location of the any of the components having the difference between the actual performance and the desired performance and the adjustment to the operation of the elevator system is localized based on the determined location.

In an example embodiment having one or more features of the elevator system of any of the previous paragraphs, the plurality of sensors include sensors that sense at least one of a sound emitted by an associated component during operation of the elevator system, vibration of an associated component during operation of the elevator system, and an amount of movement of an associated component during operation of the elevator system.

An example embodiment having one or more features of the elevator system of any of the previous paragraphs includes at least one door and a door mover. The plurality of components include door components associated with movement of the at least one door. The determined adjustment of operation of the elevator system comprises an adjustment of the movement of the at least one door. The door mover implements the adjustment of the movement of the at least one door based on a communication from the processor.

In an example embodiment having one or more features of the elevator system of any of the previous paragraphs, the door components include any of a lock, a coupler, a sill, a roller, a rail, or a door mover.

An example embodiment having one or more features of the elevator system of any of the previous paragraphs includes an elevator car and a controller that controls movement of the elevator car. The plurality of components include movement-related components associated with movement of the elevator car. The determined adjustment of operation of the elevator system comprises an adjustment of the movement of the elevator car. The controller implements the adjustment of the movement of the elevator car based on a communication from the processor.

In an example embodiment having one or more features of the elevator system of any of the previous paragraphs, the movement-related components include any of a guiderail, a rail bracket, a guide roller, a guide shoe, a deflector sheave, a traction sheave, a governor device, a rope, or a belt.

In an example embodiment having one or more features of the elevator system of any of the previous paragraphs, the plurality of sensors wirelessly communicate with the processor.

An illustrative example embodiment of a method of controlling operation of an elevator system, which includes a plurality of components respectively configured for at least one function during the operation of the elevator system, includes sensing at least one characteristic of an actual performance of at least one of the components, automatically determining a difference between the actual performance and a desired performance of any of the components, automatically determining an adjustment to the operation of the elevator system based upon the determined difference, and automatically implementing the adjustment to the operation of the elevator system.

An example embodiment having one or more features of the method of the previous paragraph includes using a plurality of sensors to perform the sensing, each of the sensors being associated with at least one of the components and using a processor to automatically perform the determining and the implementing.

An example embodiment having one or more features of the method of any of the previous paragraphs includes determining an expected remaining service life of at least one of the components based on the sensed at least one characteristic of the at least one of the components.

An example embodiment having one or more features of the method of any of the previous paragraphs includes determining whether service is required for the at least one of the components having the determined expected remaining service life, determining a time when the service is required, and issuing a request for service according to the determined time.

An example embodiment having one or more features of the method of any of the previous paragraphs includes determining a location of the any of the components having the difference between the actual performance and the desired performance, and implementing the adjustment to the operation of the elevator system in a localized portion of the elevator system based on the determined location.

In an example embodiment having one or more features of the method of any of the previous paragraphs, the sensing comprises at least one of sensing a sound emitted by at least one of the components during operation of the elevator system, sensing vibration of at least one of the components during operation of the elevator system, and sensing an amount of movement of at least one of the components during operation of the elevator system.

In an example embodiment having one or more features of the method of any of the previous paragraphs, the elevator system includes at least one door and a door mover, the plurality of components include door components associated with movement of the at least one door, and adjusting the operation of the elevator system comprises adjusting operation of the door mover to adjust the movement of the at least one door.

In an example embodiment having one or more features of the method of any of the previous paragraphs, the elevator system includes an elevator car and a controller that controls movement of the elevator car, the plurality of components include movement-related components associated with movement of the elevator car, and adjusting the operation of the elevator system comprises using the controller for adjusting the movement of the elevator car.

An example embodiment having one or more features of the method of any of the previous paragraphs includes using a plurality of sensors to perform the sensing, using a processor to perform the determining, and wirelessly communicating between the sensors and the processor.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention provide the ability to address situations involving one or more components of an elevator system before any problem with those components requires removing the elevator from service. When a difference between the actual performance and desired performance of at least one component of the elevator system exists, operation of the elevator system involving any such component is automatically adjusted to reduce an effect of the condition of such components. This approach allows for maintaining a desired passenger experience such as ride quality, keeping the elevator in service, prolonging the service life of such a component, or a combination of those.

Figure 1:
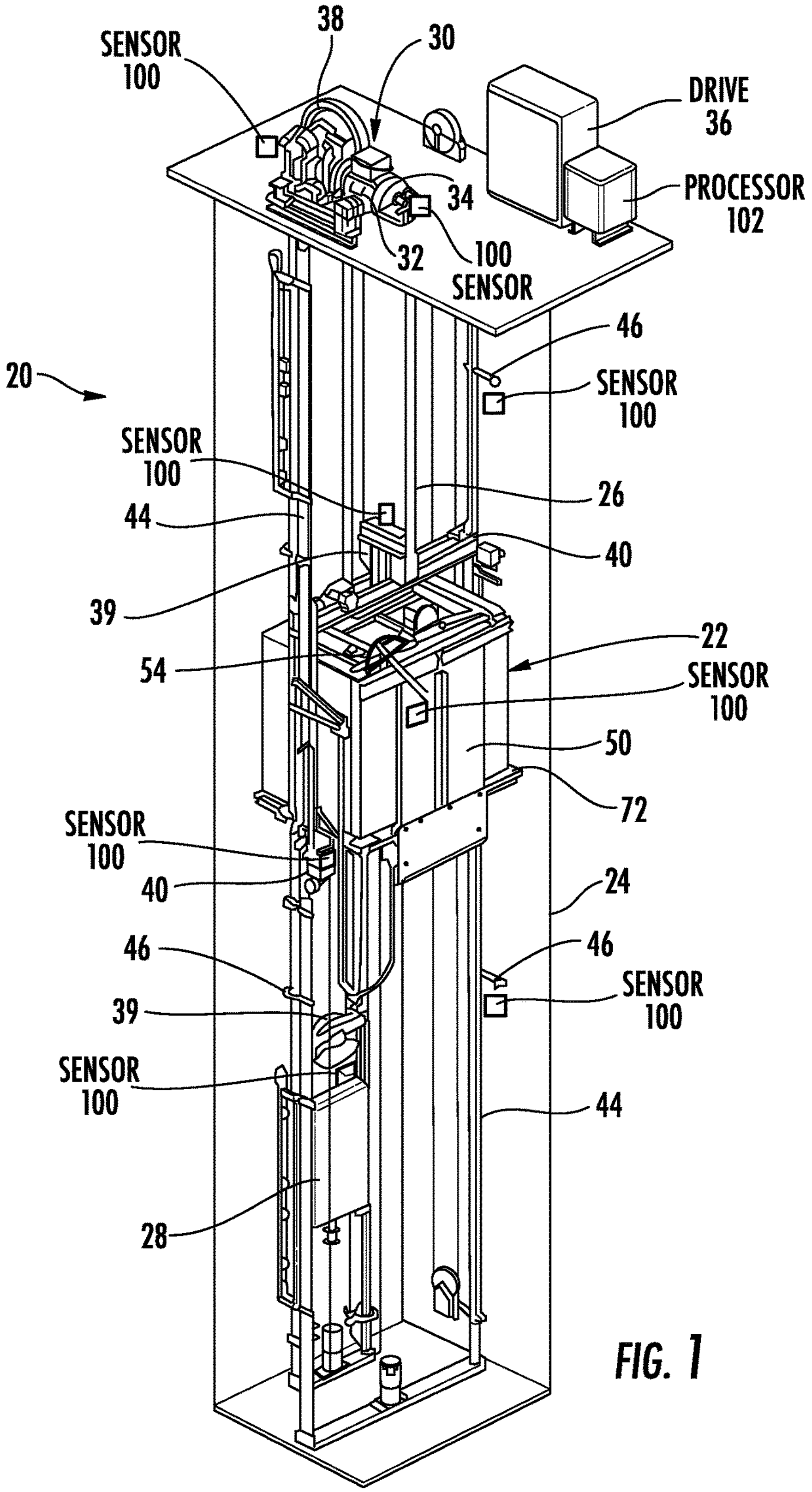
FIG. 1 schematically illustrates selected portions of an elevator system designed according to an embodiment of this invention.

FIG. 1 diagrammatically illustrates selected portions of an elevator system 20. An elevator car 22 is situated for movement within a hoistway 24. A roping arrangement 26, which may include a plurality of ropes or belts for example, supports the weight of the elevator car 22 and couples the elevator car 22 to a counterweight 28.

The elevator system 20 includes a plurality of components that are associated with movement of the elevator car 22. A machine 30 includes a motor 32 and brake 34 that operate under the control of a drive 36. The motor 32 and brake 34 control movement of a traction sheave 38 to cause desired movement or position control of the elevator car 22 within the hoistway 24. In addition to the traction sheave 38, the example elevator system 20 includes idler sheaves 39 associated with the elevator car 22 and counterweight 28. Those skilled in the art will realize that various roping arrangements are possible and each will have an appropriate number and arrangement of sheaves.

Figure 2:
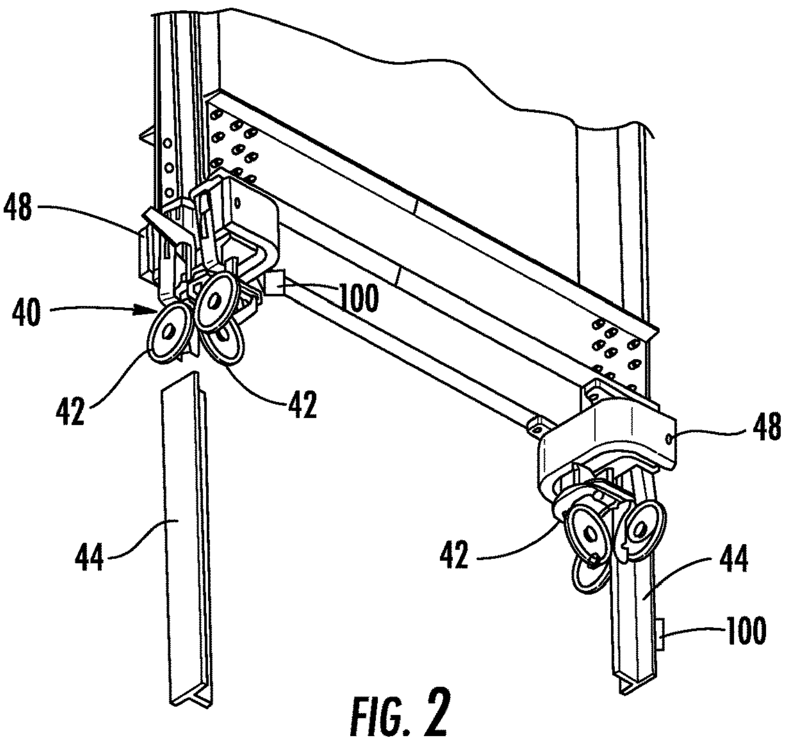
FIG. 2 is a diagrammatic illustration of an example set of components associated with movement of the elevator car in the example elevator system shown in FIG. 1.

As shown in FIGS. 1 and 2, guide devices 40 include guide rollers 42 that follow along guiderails 44 to facilitate movement of the elevator car 22. The guiderails 44 are held in place by guiderail brackets 46. As shown in FIG. 2, safety braking mechanisms 48 are provided near the guide rollers 42.

Figure 3:
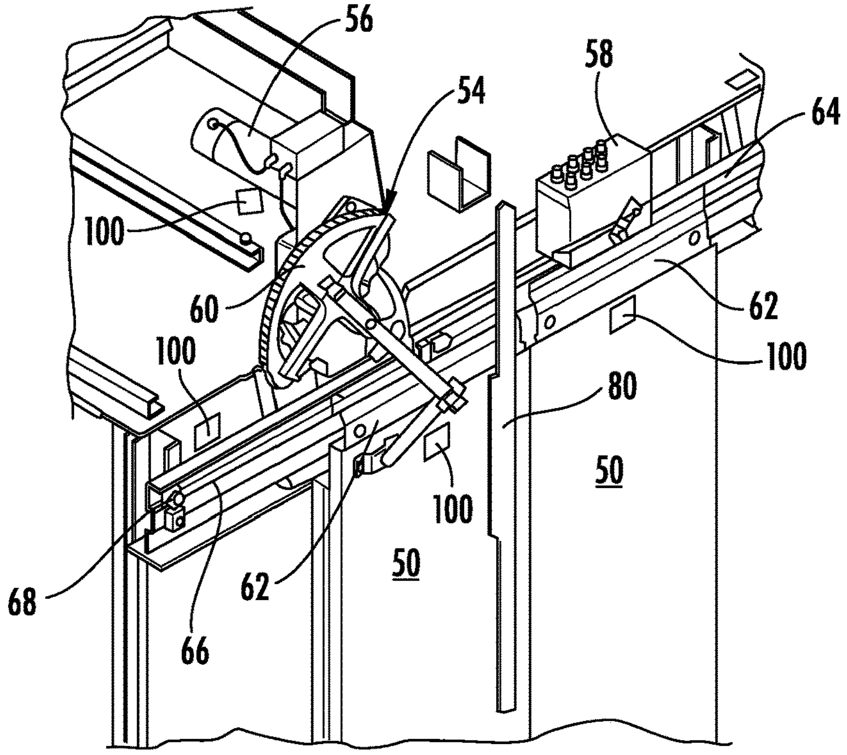
FIG. 3 diagrammatically illustrates example components associated with doors of the example elevator car.

Other components of the elevator system 20 are associated with movement of elevator car doors 50. As shown in FIG. 3, a door mover 54 includes a motor 56, a door controller 58, and a moving mechanism 60. The doors 50 are supported by door hangers 62 that include rollers that follow along a track 64 supported on the elevator car 22. The elevator car doors 50 are coupled with each other for simultaneous movement by a cable or belt 66 that follows a loop around pulleys 68 that are also supported on the track 64. The door moving components operate in a known manner to cause the doors 50 to open and close as needed to allow passengers to enter or exit the elevator car 22.

Figure 4:
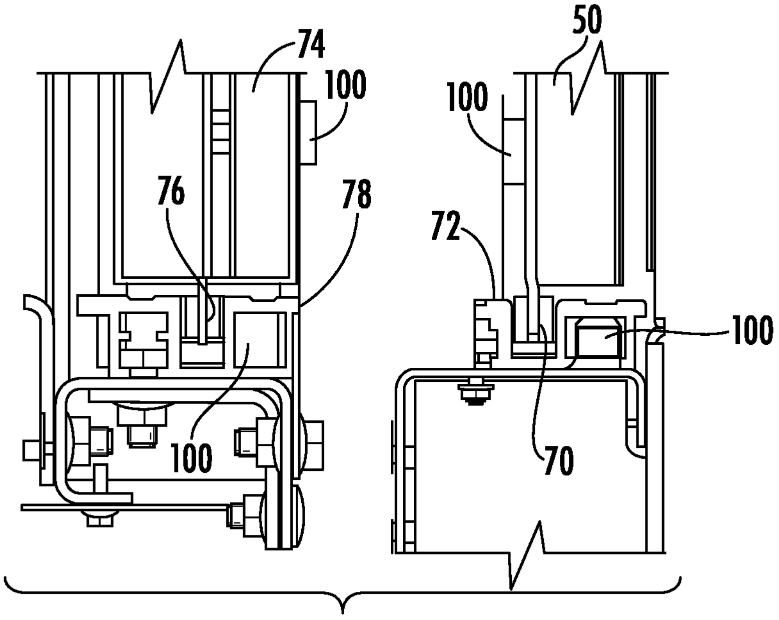
FIG. 4 diagrammatically illustrates more example door components.

FIG. 4 shows additional door components near a lower end of the doors. An elevator car door 50 includes a gib 70 that follows along a track in a door sill 72 supported on the elevator car 22. FIG. 4 also shows a hoistway or landing door 74 that includes a gib 76 that follows along a track in a door sill 78 at a landing along the hoistway 24.

The hoistway door 74 moves with the elevator car door 50 between open and closed positions. A door coupler mechanism includes a vane 80 on the elevator car door 50 and cooperating components on the hoistway door 74, which are not illustrated. Door couplers work in a known manner.

Figure 5:
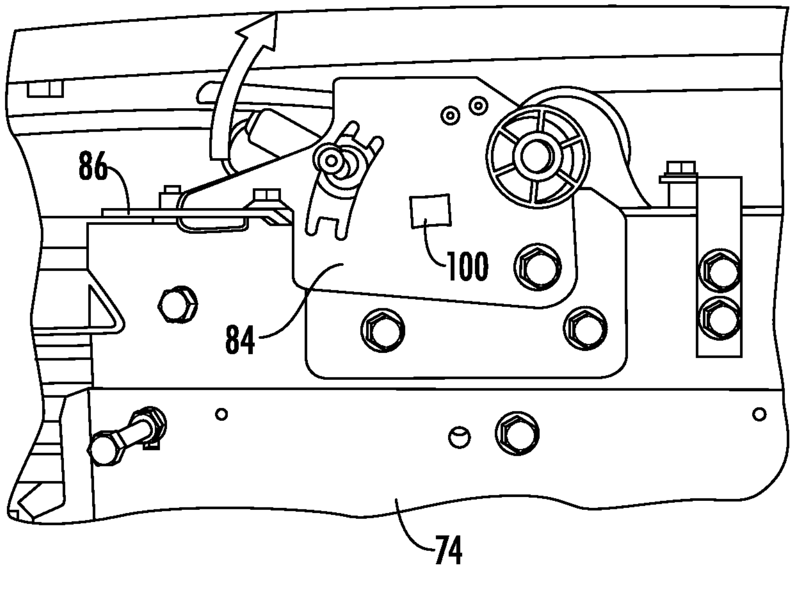
FIG. 5 diagrammatically illustrates a door lock associated with a hoistway door of the example elevator system.

As shown in FIG. 5, the landing or hoistway door 74 includes a door lock mechanism 84 that holds the hoistway door 74 closed unless the elevator car 22 is appropriately situated at the corresponding landing.

As can be appreciated from the illustrated example components shown in FIGS. 3-5, there are a variety of components involved with or associated with movement of the elevator car doors 50.

The elevator system 20 includes a plurality of sensors 100 that are each associated with at least one of the components in the elevator system 20 that are configured to perform at least one function during elevator system operation. The sensors 100 sense at least characteristic of the actual performance of the associated components. For example, the sensors 100 are configured to detect one of a sound emitted by an associated component, vibration of an associated component, or an amount of movement of an associated component during operation of the elevator system. The sensors 100 provide respective indications of the detected characteristic of the associated component to a processor 102 that is configured to use information from the sensors 100 to determine a status or condition of the various components of the elevator system 20. In the illustrated example embodiment, the sensors 100 communicate wirelessly with the processor 102.

The processor 102 is configured, such as by being programmed, to analyze the information or indications from the sensors 100 and to automatically determine a change in the operation of the elevator system 20 that can address or compensate for any difference between the actual performance of any of the components and the desired performance of such components. In the illustrated example, the processor 102 is a separate computing device that is distinct from the drive 36 and the processor 102 communicates the adjustment to the drive 36 or the door controller 58 for implementing the adjustment.

Figure 6:
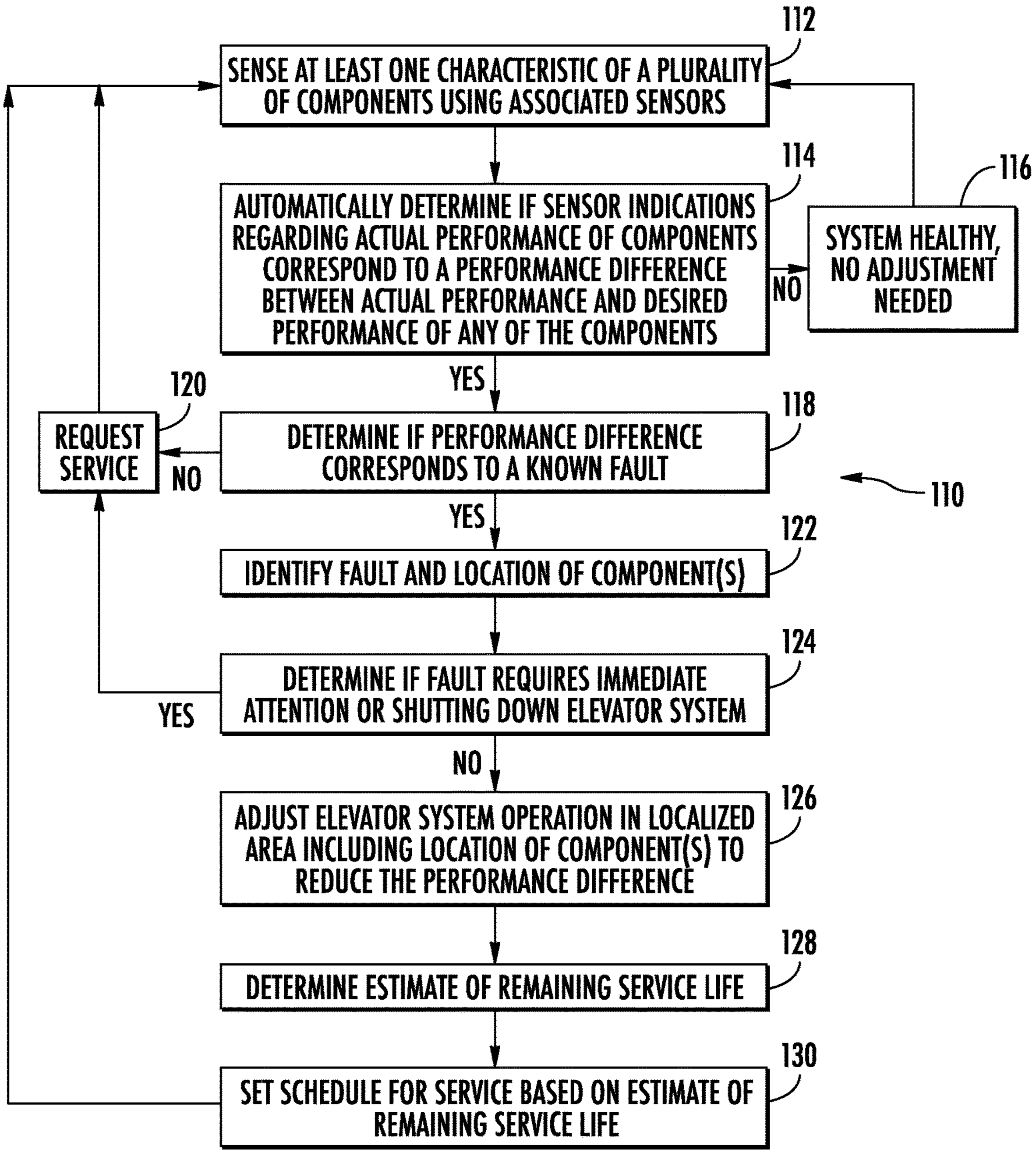
FIG. 6 is a flowchart diagram summarizing an example strategy for adjusting operation of the elevator system.

FIG. 6 is a flowchart diagram 110 of an example approach. At 112 at least one characteristic of the various components of the elevator system 20 are sensed by the sensors 100. At 114 the processor 102 receives respective indications from the sensors 100 regarding the sensed characteristic of an associated component, which provide information regarding the actual performance of the respective components. At 114 the processor 102 automatically determines if any of the sensor indications regarding the actual performance of an associated component corresponds to a performance difference between the actual performance of the component and a desired performance of that component. If all of the sensors 100 provide indications that correspond to all monitored components functioning properly and performing as desired, the processor 102 makes a determination at 116 that the elevator system 20 is healthy or fully functional and no adjustment is required.

If any of the sensor indications indicate a performance difference between the actual and desired performance of any of the monitored components, the processor 102 determines at 118 whether the performance difference corresponds to a known fault condition. Under some circumstances, the sensor indication will not correspond to a known fault. In such situations, according to the illustrated example embodiment, the processor 102 requests service at 120. This allows for addressing unknown fault conditions that may require immediate attention from a mechanic or service personnel. In some embodiments, the elevator system 20 is removed from service when an unknown or indeterminate fault occurs.

If the processor 102 determines at 118 that a performance difference corresponds to a known fault, then the processor 102 identifies the fault and the location of the component or components whose performance differs from the desired performance at 122.

At 124 the processor 102 determines whether the identified fault requires immediate attention or shutting down the elevator system 20. If so, service is requested at 120 and the elevator system 20 may be removed from service. In the event that the identified fault does not require immediate attention, the processor 102 determines a way in which the elevator system operation can be adjusted to compensate for or alleviate an effect of the fault condition.

In some situations, the fault condition is localized to a particular component or particular portion of the hoistway 24. In such situations, the adjustment to the elevator system operation is localized to the area that includes the component or components presenting the fault conditions.

The adjustment to the elevator system operation can reduce the performance difference between the desired performance and the actual performance of the component involved with the fault. For example, if a section of one of the guiderails 44 is not fully secured by a bracket 46 or otherwise has some feature that introduces vibration as the elevator car 22 travels along that section of the guiderail 44, the speed of elevator car movement at that location may be reduced compared to the contract speed to reduce the vibration otherwise introduced along that section of the guiderail 44. Another example way in which an adjustment to the elevator system can be localized is a scenario in which one of the gibs 76 of a hoistway door 74 at one of the landings is squeaking during movement of the door 74 relative to the sill 78, the speed of door movement caused by the door moving mechanism 54 may be adjusted to reduce the sound when that particular hoistway door 74 moves. The processor 102 communicates with the door controller 58 to implement an adjustment to movement of the doors 50 for such a situation. The door moving mechanism 54 can operate according to the designed or installed parameters at all other landings because none of them present the same fault or concern.

Given this description those skilled in the art will realize how other adjustments to the elevator system operation can be made to reduce an effect of the actual performance of any faulty components that are particularly directed at the function of such components without altering the operation of the elevator system 20 throughout the entire hoistway 24. Different movement speeds or motion profiles can be used in particular locations, for example, to address noise or vibration issues that are detected by the corresponding sensors 100. This approach allows for addressing issues presented by one or a few components while keeping the elevator system in service and performing as close as possible to the designed or intended elevator system operation parameters.

One feature of embodiments of this invention is that the possibility exists for localizing adjustments to operation of the elevator system 20 or operation of particular components of that system based upon the identified fault condition. Such localized adjustment can mitigate or reduce the difference between the actual performance of a component and the desired performance of that component. Another aspect of adjusting the elevator system performance is that it allows for extending the service life of a malfunctioning or damaged component by reducing the impact or effect that the condition of the component is having on the component's performance of its function within the elevator system 20. For example, where vibration could cause component wear, adjusting the operation to reduce such vibration will also reduce the rate at which such a component experiences wear.

According to the example of FIG. 6, the processor 102 determines an estimated remaining service life of a component involved in a fault condition at 128. For example, if a component is causing vibration, the level of vibration may indicate the condition of the component. Where a larger amount of vibration is occurring, the processor 102 determines that based on an indication from the associated sensor 100 and uses that information to estimate a remaining life of that component. Similarly, a component that is squeaking quietly may have a longer remaining service life compared to a component that is squeaking loudly and the indication from the respective sensor 100 associated with that component will provide information to the processor 102 allowing it to determine an estimate of the remaining service life of that component. In one example, embodiment the processor 102 has predetermined criteria for gauging how the sensor indications correspond to an expected remaining service life for a variety of components.

In some embodiments, the processor 102 repeatedly or periodically adjusts the estimated remaining service life. For example, when an adjustment to elevator system operation has been implemented that reduces the effect of the fault condition, the expected service life of the involved component may increase because the adjustment reduces the occurrence or rate of additional wear. The processor 102 in some embodiments is programmed to update an estimate of the remaining service life based on subsequent sensor information reflecting the different conditions associated with the adjusted operation. Alternatively, the processor 102 can alter the estimated remaining service life when sensor information indicates a worsening condition of a component.

Based on the determined remaining service life, at 130 the processor 102 sets a schedule for service of that component. The scheduled service may simply indicate that the issue should be addressed the next time a mechanic or service personnel is at the location of the elevator system 20. In some embodiments, the scheduled service will have a target date or time period for performing maintenance on the component whose performance is different than the desired performance. Such a schedule or target time may be communicated by the processor 102 to a contractor that is responsible for maintenance of the elevator system 20. In the event that a service life estimate changes, the processor 102 updates the schedule for service according to the change in the estimate.

Embodiments of this invention enhance elevator system operation by automatically addressing differences in the actual performance and the desired performance of a variety of elevator system components. Such automatic adjustment can be localized to particular areas or components of the elevator system. The automatic adjustment allows for conditions to be addressed before service personnel is able to arrive at the site of an elevator system, which reduces the need for immediate callbacks and can prolong the service life of elevator system components.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
- a plurality of components respectively configured for at least one function during operation of the elevator system;
- a plurality of sensors, each of the sensors being associated with at least one of the components, each sensor sensing at least one characteristic of an actual performance of the at least one of the components associated with the sensor; and
- a processor that is configured to
  - receive respective indications from the sensors regarding the actual performance of the at least one of the components associated with each sensor,
  - determine a difference between the actual performance and a desired performance of any of the components based on the respective indications,
  - determine an adjustment to the operation of the elevator system based upon the determined difference,
  - determine an expected remaining service life of at least one of the components based on the respective indication from the sensor associated with the at least one of the components, and
  - determine an adjusted expected remaining service life based upon at least one of the determined adjustment being made and a change in the respective indication from the sensors regarding the actual performance of the at least one of the components associated with each sensor.

2. The elevator system of claim 1, wherein the processor is configured to determine whether service is required for the at least one of the components having the determined expected remaining service life.

3. The elevator system of claim 2, wherein the processor is configured to determine a time when the service is required and to issue a request for service according to the determined time.

4. The elevator system of claim 1, wherein the plurality of sensors wirelessly communicate with the processor.

5. The elevator system of claim 1, wherein
- the processor is configured to determine a location of the any of the components having the difference between the actual performance and the desired performance; and
- the adjustment to the operation of the elevator system is localized based on the determined location.

6. The elevator system of claim 1, wherein the plurality of sensors include sensors that sense at least one of
- a sound emitted by an associated component during operation of the elevator system,
- vibration of an associated component during operation of the elevator system, and
- an amount of movement of an associated component during operation of the elevator system.

7. The elevator system of claim 6, comprising
- at least one door; and
- a door mover;
- wherein
- the plurality of components include door components associated with movement of the at least one door;
- the determined adjustment of operation of the elevator system comprises an adjustment of the movement of the at least one door; and
- the door mover implements the adjustment of the movement of the at least one door based on a communication from the processor.

8. The elevator system of claim 7, wherein the door components include any of a lock, a coupler, a sill, a roller, a rail, or a door mover.

9. The elevator system of claim 6, comprising
- an elevator car; and
- a controller that controls movement of the elevator car;
- wherein
- the plurality of components include movement-related components associated with movement of the elevator car;
- the determined adjustment of operation of the elevator system comprises an adjustment of the movement of the elevator car; and the controller implements the adjustment of the movement of the elevator car based on a communication from the processor.

10. The elevator system of claim 9, wherein the movement-related components include any of a guiderail, a rail bracket, a guide roller, a guide shoe, a deflector sheave, a traction sheave, a governor device, a rope, or a belt.

11. A method of controlling operation of an elevator system that includes a plurality of components respectively configured for at least one function during the operation of the elevator system, the method comprising:

sensing at least one characteristic of an actual performance of at least one of the components;

determining an expected remaining service life of at least one of the components based on the sensing regarding the at least one of the components;

automatically determining differences between the actual performance and a desired performance of any of the components;

automatically determining an adjustment to the operation of the elevator system based upon one or more determined differences;

automatically implementing the adjustment to the operation of the elevator system;

and determining an adjusted expected remaining service life based upon at least one of the automatically implemented adjustments and a change in any differences between the actual performance and the desired performance of any of the components.

12. The method of claim 11, comprising using a plurality of sensors to perform the sensing, each of the sensors being associated with at least one of the components; and using a processor to automatically perform the determining and the implementing.

13. The method of claim 11, comprising determining whether service is required for the at least one of the components having the determined expected remaining service life;

determining a time when the service is required; and issuing a request for service according to the determined time.

14. The method of claim 11, comprising determining a location of the any of the components having the difference between the actual performance and the desired performance; and implementing the adjustment to the operation of the elevator system in a localized portion of the elevator system based on the determined location.

15. The method of claim 11, wherein the sensing comprises at least one of sensing a sound emitted by at least one of the components during operation of the elevator system, sensing vibration of at least one of the components during operation of the elevator system, and sensing an amount of movement of at least one of the components during operation of the elevator system.

16. The method of claim 15, wherein the elevator system includes at least one door and a door mover;

the plurality of components include door components associated with movement of the at least one door; and adjusting the operation of the elevator system comprises adjusting operation of the door mover to adjust the movement of the at least one door.

17. The method of claim 15, wherein the elevator system includes an elevator car and a controller that controls movement of the elevator car;

the plurality of components include movement-related components associated with movement of the elevator car; and adjusting the operation of the elevator system comprises using the controller for adjusting the movement of the elevator car.

18. The method of claim 11, comprising using a plurality of sensors to perform the sensing;

using a processor to perform the determining; and wirelessly communicating between the sensors and the processor.

* * * * *